United States Patent [19]

Lenard et al.

[11] 4,436,000
[45] Mar. 13, 1984

[54] SHARPENING MACHINE FOR SAWS

[75] Inventors: Peter Lenard, Biberach; Ernst Beck, Maselheim, both of Fed. Rep. of Germany

[73] Assignee: Vollmer Werke Maschinenfabrik GmbH, Fed. Rep. of Germany

[21] Appl. No.: 378,195

[22] Filed: May 14, 1982

[30] Foreign Application Priority Data

May 22, 1981 [DE] Fed. Rep. of Germany ....... 3120465

[51] Int. Cl.$^3$ .............................................. B23D 63/14
[52] U.S. Cl. ............................................ 76/41; 76/37
[58] Field of Search .......................... 76/37, 40, 41, 43

[56] References Cited

U.S. PATENT DOCUMENTS 3,960,037  6/1976  Stier ........................................ 76/43
4,136,585  1/1979  Lenard .................................... 76/40

FOREIGN PATENT DOCUMENTS 2717111 10/1978  Fed. Rep. of Germany .......... 76/37
2751408  5/1979  Fed. Rep. of Germany .......... 76/37

*Primary Examiner*—Roscoe V. Parker

*Attorney, Agent, or Firm*—Burns, Doane, Swecker and Mathis

[57] ABSTRACT

A sharpening machine for saws has a mount for a saw blade and a carrier which is adapted to be tilted about an axis of tilt oriented perpendicular to the plane of the saw blade. A support which is supported on the carrier is capable of swivelling relative to the carrier through at least 180° about a swivel axis lying in the plane of the saw blade by a swivelling device and is capable of reciprocating along the swivel axis by a lifting device. A grinding head is supported on the support and carries a plate-shaped or cup-shaped grinding wheel and a grinding motor for driving the grinding wheel. The swivel axis in one operating position of the grinding wheel is contiguous with an active face of the grinding wheel. A second grinding wheel on the grinding head is arranged in offset relationship with respect to the first-mentioned grinding wheel. The grinding head is reciprocable relative to the support between the operating position of the first grinding wheel and a corresponding operating position or the second grinding wheel. The sharpening machine for saws according to the present invention reduces the setting-up time and idle periods of the machine in comparison to the machining time, even when complicated saw toothing is being sharpened.

15 Claims, 18 Drawing Figures

FIG.11A  FIG.11B  FIG.12A  FIG.12B
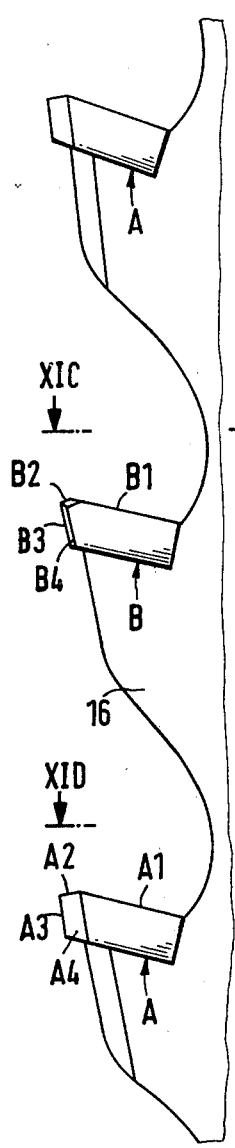 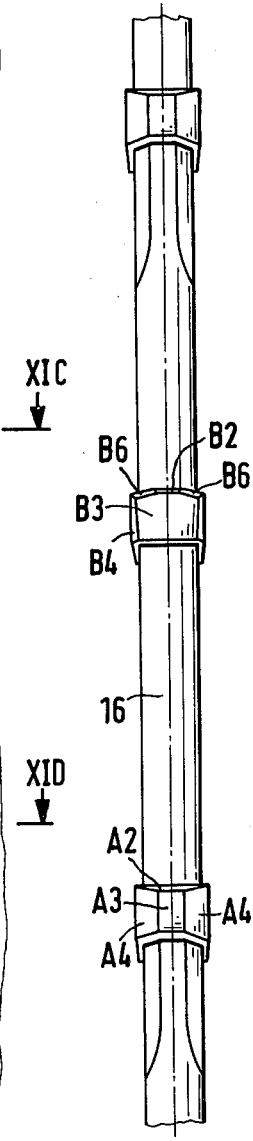 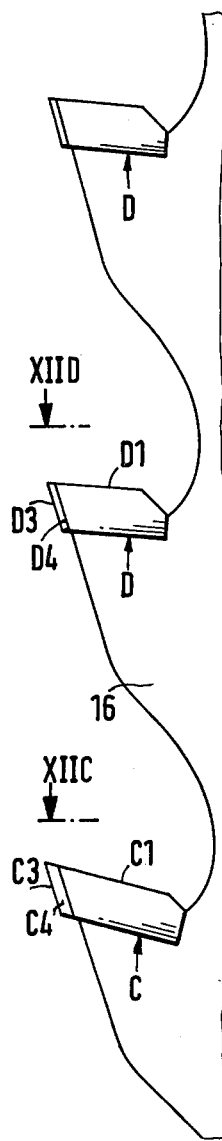 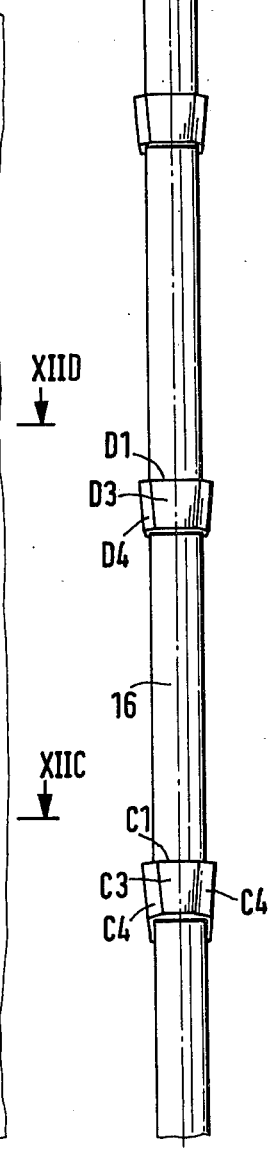
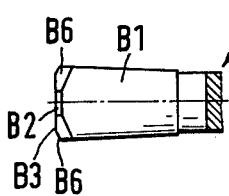 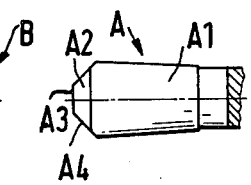 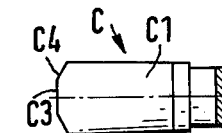 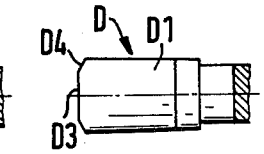
FIG.11C  FIG.11D  FIG.12C  FIG.12D

SHARPENING MACHINE FOR SAWS

BACKGROUND AND SUMMARY OF THE PRESENT INVENTION

The present invention relates generally to sharpening machines for saws and more specifically relates to sharpening machines for saws wherein a carrier is tiltable to different orientations.

Sharpening machines of this sort generally include a mount for a saw blade and a tiltable carrier which is adapted to be tilted about an axis of tilt oriented perpendicular to the plane of a saw blade. A support which is movably secured to the carrier is arranged so as to swivel relative to the carrier through at least 180° about a swivel axis lying in the plane of the saw blade. A lifting device provides for reciprocal movement of the support along the swivel axis. A grinding head is connected to the support and carries a grinding wheel whose active face is contiguous with the swivel axis. The orientation of the grinding wheel with respect to a saw tooth may be adjusted to accommodate the sharpening of various sized saw teeth by moving the above-mentioned components relative to one another.

In a known sharpening machine for saws, such as is disclosed in DE-OS No. 26 14 419 and corresponding U.S. Pat. No. 4,136,585 of Lenard, the swivel axis of the grinding head intersects the axis of tilt of the carrier at right angles. The grinding head can be swiveled about the swivel axis by 45° to one side and by 225° (i.e. 180° plus 45°) to the other side.

In a further development of this known sharpening machine for saws as disclosed in German OS No. 27 51 408, a swiveling device for the grinding head includes a shaft whose geometric axis constitutes the swivel axis of the grinding head and whose range of swivel from the standard position is less than 90° in both directions of swivel. The grinding head is attached to the shaft in one of two positions which are offset by 180°.

In both of the above-mentioned sharpening machines for saws, a grinding wheel spindle is mounted to the grinding head. A plate-shaped grinding wheel having an operating or active face is attached in two different selected orientations at one end of the grinding wheel spindle. In a first orientation, the face is turned to the grinding head and in a second orientation, the face is turned away from the grinding head. The first orientation is suitable, by way of example, for grinding faces (cutting edges of teeth) having a positive rake angle, and the second orientation is suitable for grinding flanks at the back of teeth and/or faces having a negative rake angle.

In the known machines of this type, it is possible for all faces to be ground in the first orientation of the grinding wheel during the first revolution of the saw blade. The grinding wheel is then detached from the grinding wheel spindle and turned around or replaced by another grinding wheel, which is attached to the spindle in such a way that its operating face is turned away from the grinding head. In this manner, all the flanks on the back of the teeth can be ground. Turning around or replacing the grinding wheel, however, requires an interruption of operation and labor time.

With these known sharpening machines for saws, it is possible to grind faces slanting on one side or on alternate sides in one single revolution of the saw blade and/or to grind chamfered cutting edges. Similarly, it is possible to grind flanks at the back of the teeth and to chamfer the backs of the teeth in one single revolution. However, it is not possible to combine the grinding of faces having a positive rake angle with the grinding of flanks and/or faces having a negative rake angle in a time-saving manner, e.g., in one single revolution.

Another sharpening machine for saws is known and disclosed in a catalog (WIDMA-HKS-750) issued by H. E. Widmann gmbH and Company KG,D-7902 BLAU-BEUREN in which two entirely separate grinding units are connected to a common machine frame through a swiveling device and a lifting device for each unit. The machine successively grinds the face on the cutting edge and the flank at the back of a tooth. The grinding unit for the faces is disposed on a transverse carriage, which has to be moved a considerable distance away from the saw blade before the other grinding unit can operate.

Accordingly, it is an object of the present invention to provide a sharpening machine wherein the grinding of faces having a positive rake angle and the grinding of flanks and/or faces having a negative rake angle can be accomplished in an efficient and economical manner.

Another object of the present invention is to provide a saw sharpening machine wherein the grinding of faces having a positive rake angle and the grinding of flanks and/or faces having a negative rake angle can be accomplished in a single revolution of the saw blade.

Still another object of the present invention is to develop a saw sharpening machine with moderate construction outlay and in such a way that the set-up time and idle periods of the machine can be shortened in comparison to the operating time, even when complicated saw toothing is being ground.

According to the present invention, a saw-sharpening machine is disclosed in which:

(a) a second grinding wheel is disposed at the grinding head in offset relationship to the first mentioned grinding wheel; and (b) the grinding head is reciprocable in relation to the support between an operating position of the first grinding wheel and a corresponding operating position of the second grinding wheel.

The two grinding wheels may be disposed in the grinding head in different forms of offset relationship. The type of motion which the grinding head has to perform for bringing one grinding wheel instead of the other into an operating position differs accordingly. If, for example, the two grinding wheels are disposed axially parallel at the grinding head, a rectilinear movement of the grinding head at right angles to the grinding wheel axes can cause the one grinding wheel to be replaced by the other one, as desired. It is important that, in contradistinction to the saw-sharpening machines known to the prior art, both grinding wheels are constantly ready for use. Further, in contradistinction to the other atypical saw-sharpening machine having two entirely separate grinding units, the two grinding wheels in the invention are disposed at a common grinding head and are connected by the common grinding head to the tiltable carrier by way of a common swiveling device and a common lifting device. The above-mentioned features eliminate a large number of relatively movable members and simplifies the different forms of setting-up work required from case to case.

In a preferred embodiment of the invention, the grinding head is adapted to be swiveled by a second swiveling device about a second swivel axis so as to move between two operating positions. It is expedient if the second swivel axis is oriented parallel to the first swivel axis, and if the second swivel axis intersects both grinding wheel axes at right angles. In this way, the space required for the arrangement and for interchanging the two grinding wheels is kept small.

A further preferred feature of the invention is that the second swivel axis is equidistant from the active faces of both grinding wheels. This feature also serves to reduce the space required for interchanging the two grinding wheels.

In a particularly advantageous further development of the invention, the two grinding wheel axes are in alignment. This enables the two grinding wheels, their mounting and their drive to be arranged in a particularly space-saving manner.

BRIEF DESCRIPTION OF THE DRAWINGS

A preferred embodiment of the saw-sharpening machine according to the present invention is described with reference to the accompanying drawings in which:

FIG. 11A is a side view of a first saw blade;

FIG. 11B is an edge view of the saw blade of FIG. 11A;

FIG. 11C is a view through the line X1C—X1C of FIG. 11A;

FIG. 11D is a view through the line X1D—X1D of FIG. 11A;

FIG. 12A is a side view of a second saw blade;

FIG. 12B is an edge view of the saw blade of FIG. 12A;

FIG. 12C is a view through the line X11C—X11C of FIG. 12A; and

FIG. 12D is a view through the line X11D—X11D of FIG. 12A;

DETAILED DESCRIPTION OF THE PREFERRED EMBODIMENT

Figure 1:
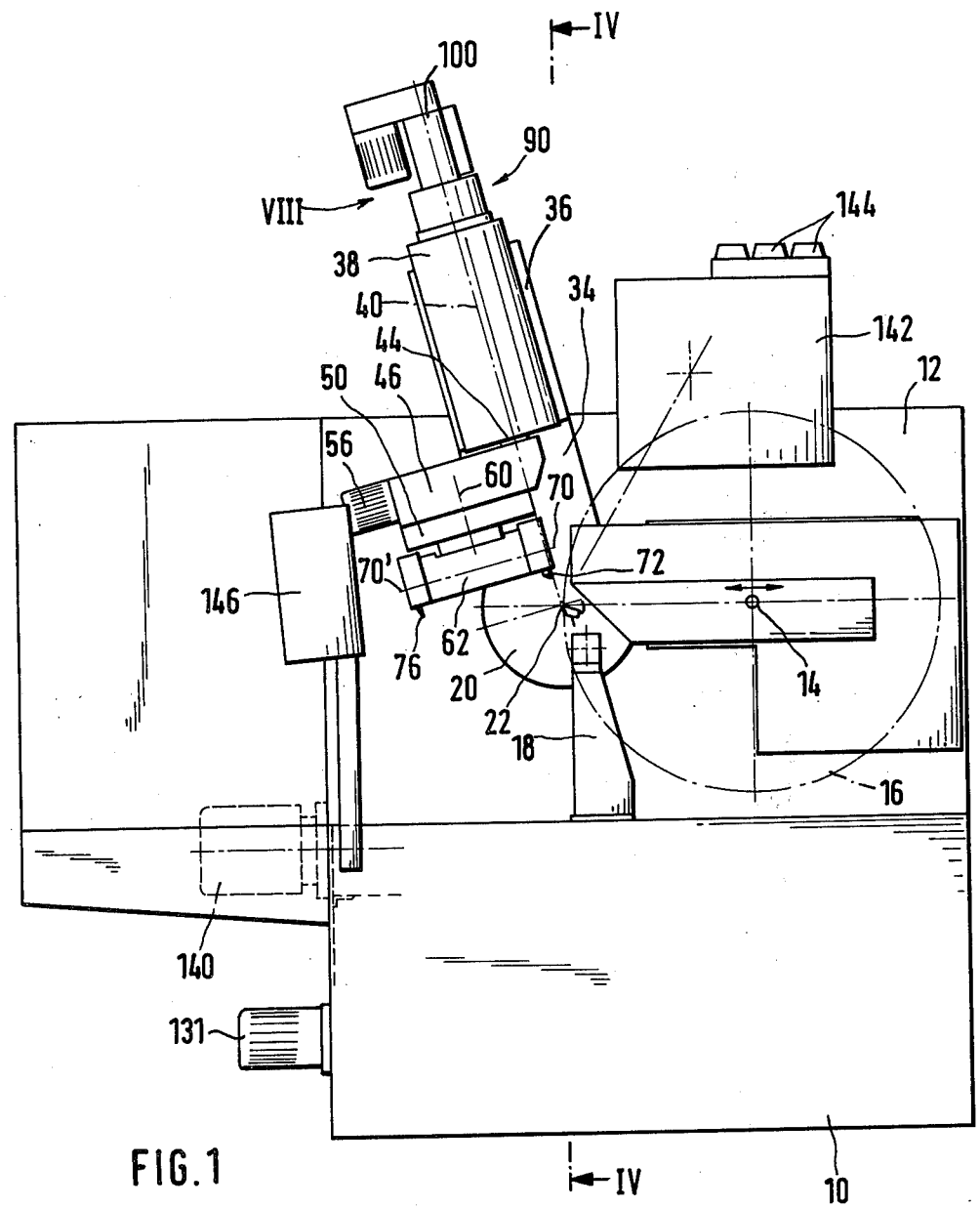
FIG. 1 is a front view of a saw sharpening machine according to the present invention set for grinding flanks at the back of a saw blade tooth.

With reference to FIG. 1, a preferred embodiment of a sharpening machine for saws according to the present invention has a box-shaped platen 10 on which a stand 12 is secured. A mount 14 for a saw blade 16 (shown in phantom) is disposed on the stand 12. The mount 14 is indicated only in the form of a bearing pin on which the circular saw blade 16 is rotatably mounted. The bearing pin is adjustable in the directions indicated by a double arrow (at 14) in FIGS. 1, 2 and 3 in order that saw blades of varying diameters can be sharpened. The mount 14 can be of any suitable, conventional configuration, such as is disclosed in DE-OS No. 24 12 938 and corresponding U.S. Pat. No. 3,960,037 of Stier.

Figure 3:
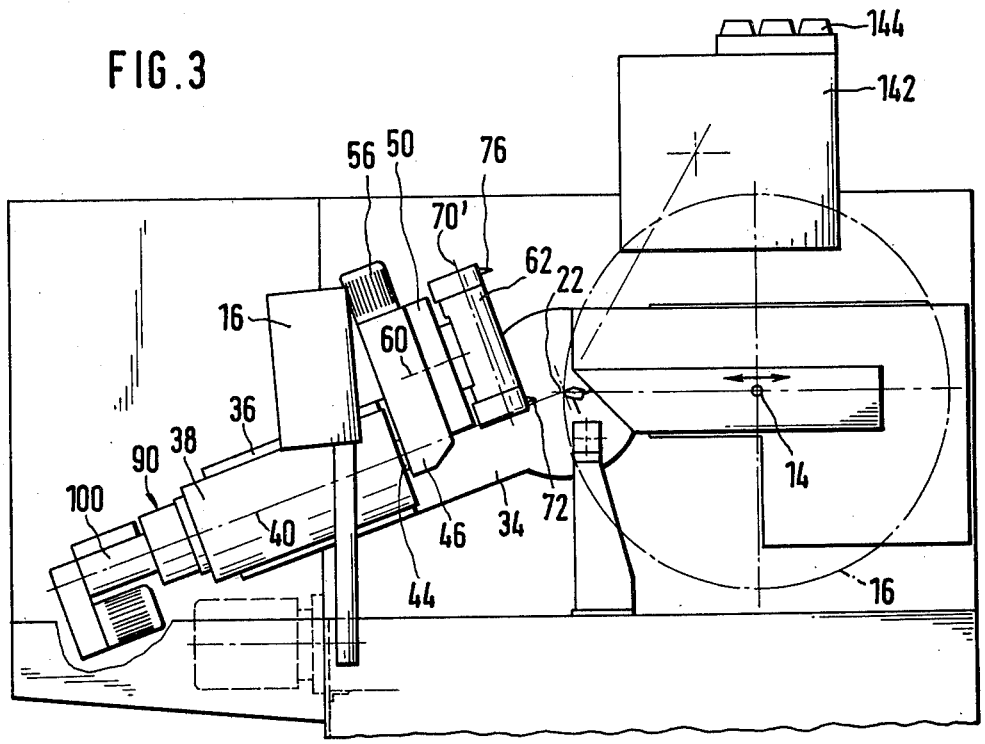
FIG. 3 is a front view in which the machine of FIG. 1 is set for grinding faces having a negative rake angle.
Figure 2:
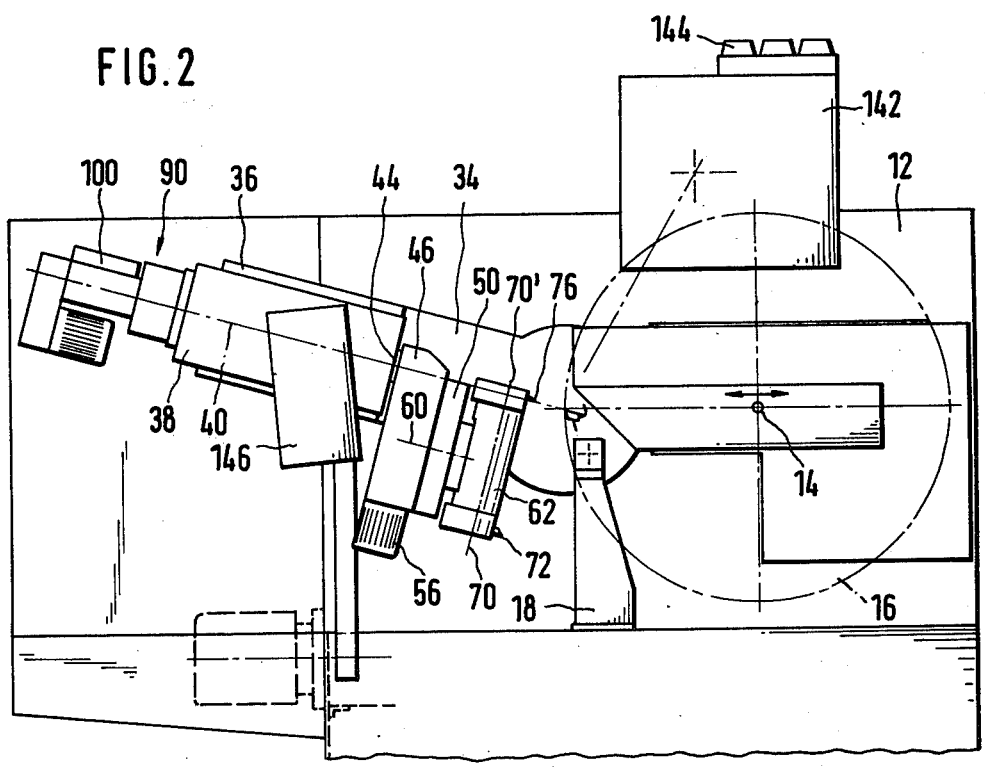
FIG. 2 is a front view in which the machine of FIG. 1 is set for grinding faces having a positive rank angle.

An advance mechanism (not illustrated) of any suitable conventional form such as, for example, as disclosed in U.S. Pat. No. 3,960,037 of Stier, is associated with the mount 14. The advance mechanism serves to advance the saw blade 16 stepwise through one or more tooth spacings in a manner such that only one tooth at a time reaches an operating position as shown in FIGS. 1, 2 and 3. An hydraulically operable clamping mechanism 18 of a conventional design is secured to the platen 10 and enables the saw blade 16 to be clamped near the tooth which is to be ground.

Figure 4:
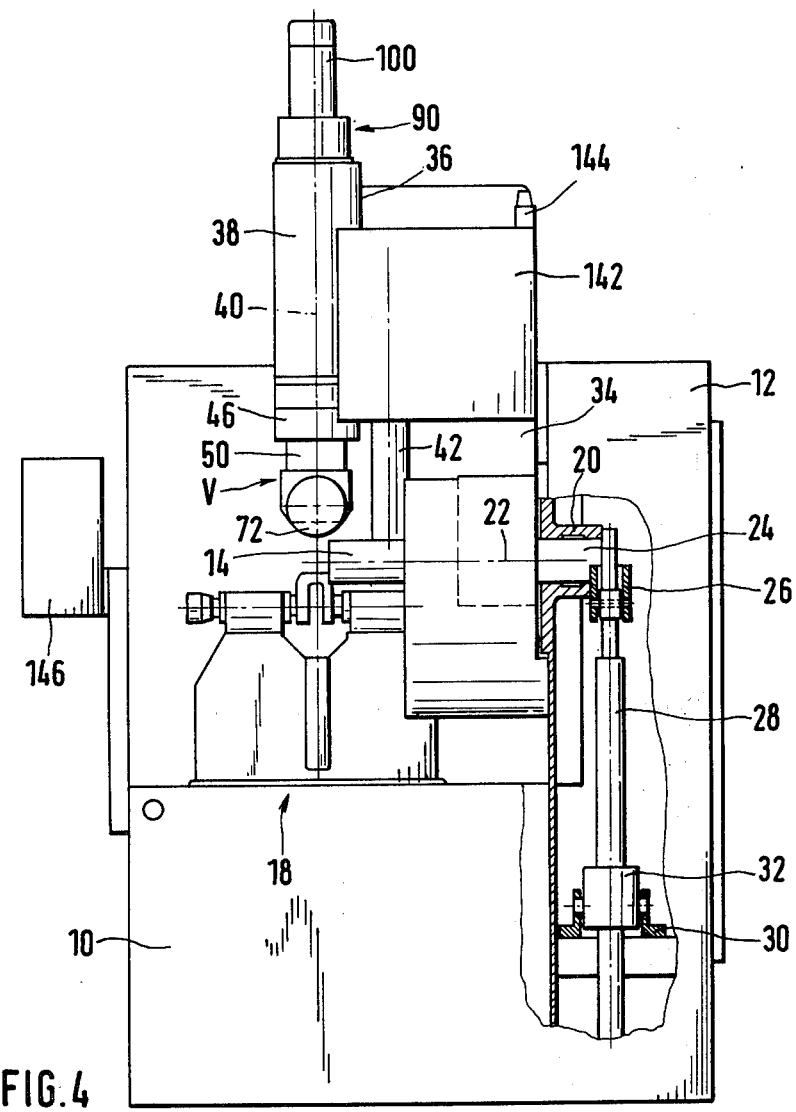
FIG. 4 is a view through the line IV—IV of FIG. 1.

As shown in FIG. 4, a rocker bearing 20 is formed in the stand 12. The geometric axis of the rocker bearing 20 is horizontal and will be hereinafter designated as an axis of tilt 22. A bearing pin 24 is mounted through an arm 26 attached to the rocker bearing 20. The bearing pin 24 is connected in an articulated manner to a piston rod of an hydraulic piston-cylinder unit 28 whose cylinder is mounted between bearing blocks 30 on the platen 10. An electrohydraulic follow-up servo control 32 such as is disclosed in German OS No. 28 29 911 is connected to the piston-cylinder unit 28 and controls the paths and speeds of the piston movements with high accuracy.

A carrier 34 is attached to an end of the bearing pin 24 remote from the arm 26. A radial guide 36 extending in a radial direction with respect to the axis of tilt 22 is formed on the carrier 34. The radial guide 36 is devised in a conventional manner as, for example, a guide having cylindrical sliding bars or a guide having a prismatic cross-sectional shape cooperating with rollers. The guide 36 guides a radial carriage 38 in such a manner that the carriage 38 can perform lifting movements along a first swivel axis 40 which intersects the axis of tilt 22 at right angles. A lifting device 42 connected between the radial carriage 38 and the carrier 34 provides the above-mentioned lifting movements. The lifting device 42 can be of any suitable conventional design and is illustrated in the preferred embodiment as a piston-cylinder unit.

Figure 5:
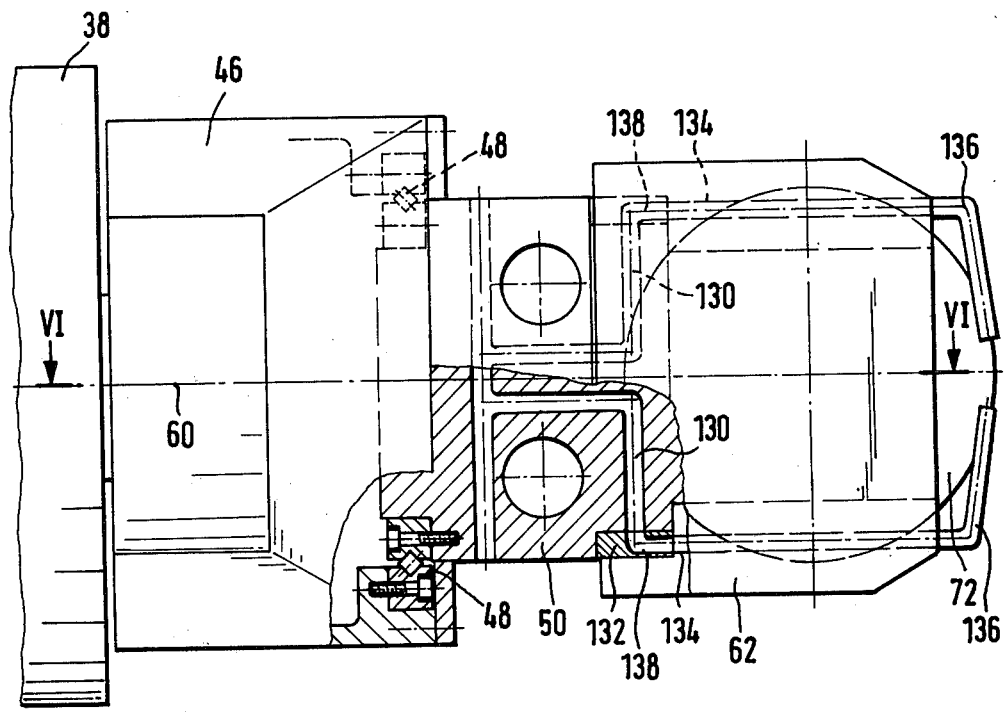
FIG. 5 is an enlarged side view of the area V of FIG. 4.
Figure 6:
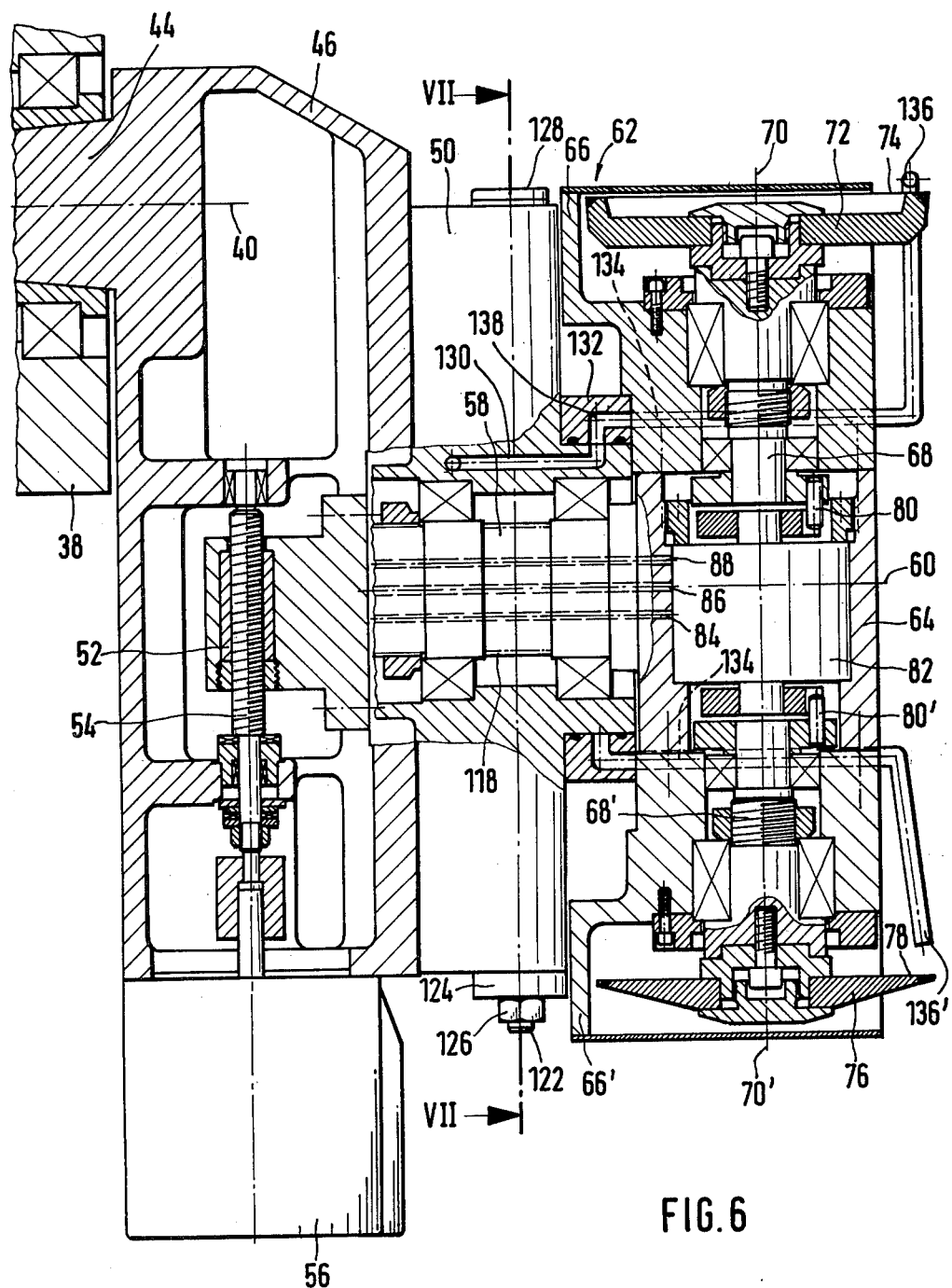
FIG. 6 is a view through the line VI—VI of FIG. 5.

As shown in FIG. 1, a shaft 44 capable of rotation but incapable of axial movement is mounted in the radial carriage 38. The geometric axis of the shaft 44 is coincident with the first swivel axis 40. A support 46 projecting to one side of the shaft 44 is attached to a bottom end of the shaft 44. As illustrated in FIGS. 5 and 6, a transverse guide 48 having a prismatic cross-sectional shape and cooperating with rollers of similar shape extends at right angles to the first swivel axis 40 and guides a feed carriage 50. A threaded spindle 54 mounted to the support 46 so as to be capable of rotation but incapable of axial movement is threaded into a spindle nut 52 attached to the feed carriage 50. A feed motor 56 which, for example, may be an electric stepping motor is flanged to the support 46 to drive the threaded spindle 54.

As shown in FIG. 6, a bearing pin 58 is mounted in the feed carriage 50. The geometric axis of the bearing pin 58 extends in a spaced relationship parallel to the first swivel axis 40 and will be hereinafter designated as a second swivel axis 60. A grinding head 62 is disposed substantially symmetrical to the second swivel axis 60. The grinding head 62 includes a center housing portion 64 integral with the bearing pin 58 and two outer housing portions 66 and 66' which are bolted to each side of the center housing portion 64. The grinding head 62 is swivably mounted to the feed carriage 50 about the second swivel axis 60 through the bearing pin 58. A grinding wheel spindle 68 and 68' is mounted in each of the two outer housing portions 66 and 66', respectively. The geometric axis of the grinding wheel spindles 68 and 68' will be hereinafter designated as grinding wheel spindle axes 70 and 70'. In the illustrated example, the two grinding wheel spindles axes 70 and 70' are in alignment and they both intersect the second swivel axis 60 at right angles.

A first plate-shaped grinding wheel 72 is attached to a free end of the grinding wheel spindle 68 and the face of the first grinding wheel 72 turned away from the grinding wheel spindle 68 is a ring-shaped, active face 74. In a corresponding manner, a second grinding wheel 76 shaped approximately like a flat plate is attached to a free end of the grinding wheel spindle 68' and a face of the second grinding wheel 76 turned towards the grinding wheel spindle 68' is an active face 78.

The two grinding wheel spindles 68 and 68' are connected to a grinding motor 82 through couplings 80 and 80', respectively, which permit certain misalignment. In the illustrated example, the grinding motor 82 is an oil motor connected to an oil pump and an oil tank in the platen 10 via an inflow duct 84, a return duct 86 and a leakage oil duct 88, all of which are formed in the bearing pin 58.

Figure 8:
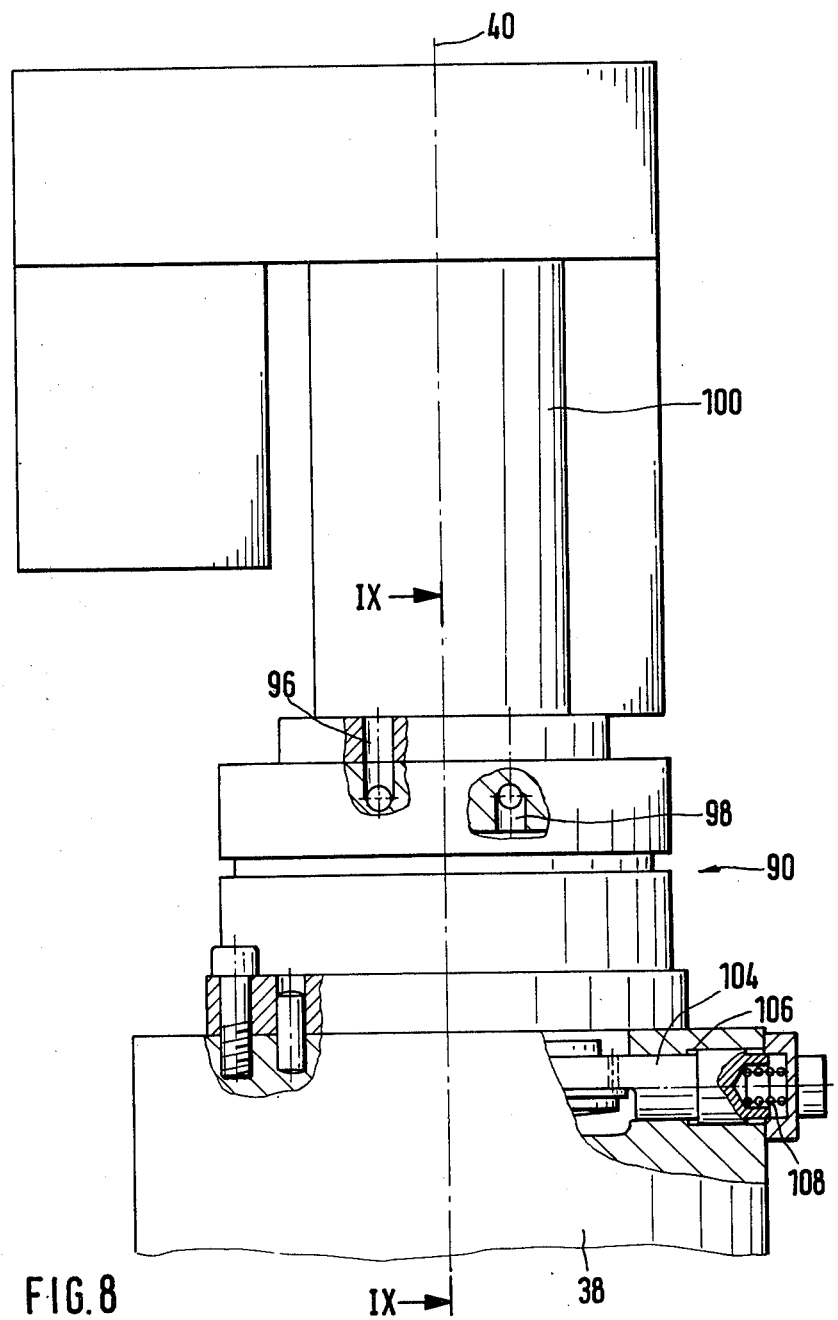
FIG. 8 is an enlarged front view of the area VIII of FIG. 1.
Figure 9:
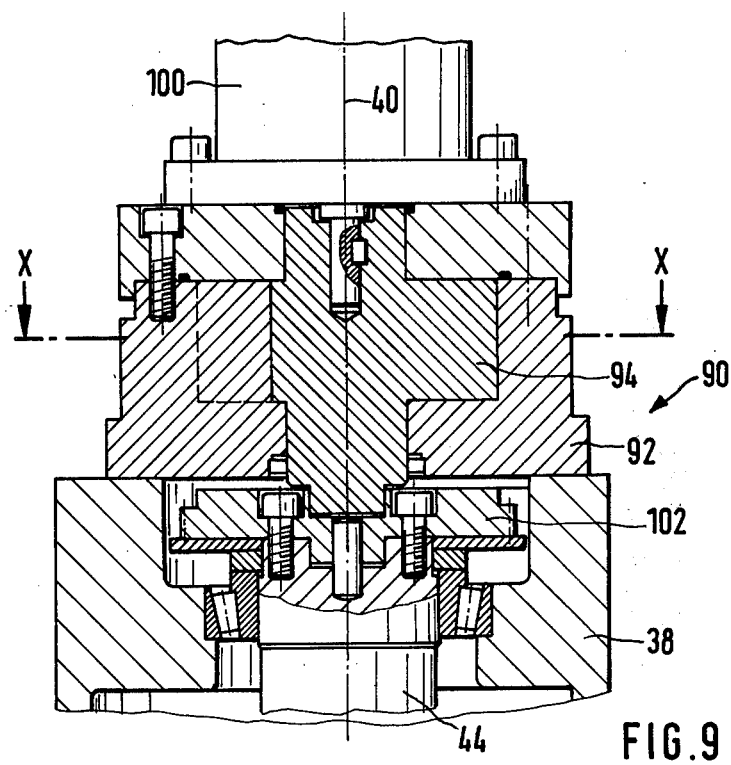
FIG. 9 is a view through the line IX—IX of FIG. 8.
Figure 10:
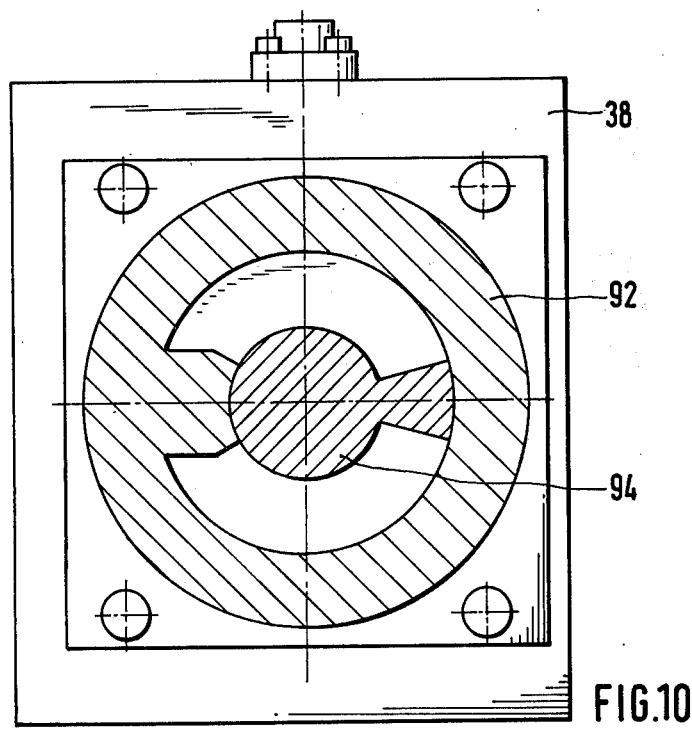
FIG. 10 is a view through the line X—X of FIG. 9.

A first swiveling device 90 is provided in order that the support 46 can be automatically swiveled about the swivel axis 40 together with all the members it bears. As illustrated in FIGS. 8–10, the swiveling device 90 includes a motor casing 92 which is secured to a top end of the radial carriage 38 (see FIGS. 1, 4, 8 and 9). The motor casing 92 contains a rotary piston 94 and oil ducts 96 and 98. The rotary piston 94 is coupled at its base to the shaft 44 and at its top to an electrohydraulic follow-up servo control 100. The follow-up servo control 100 which, for example, may be in accordance with German OS No. 29 10 530 enables the rotary piston 94 to be set at any angle of rotation with a high speed of rotation and a high degree of accuracy.

An externally toothed disk 102 is attached to the shaft 44. As illustrated in FIG. 8, a bolt 104 which is associated with the disk 102 is guided in the radial carriage 38 so as to be capable of being slid radially with respect to the first swivel axis 40. The bolt 104 has rack-like toothing at its radially inner end with which the bolt 104, in its radially inner position, engages the toothing of the toothed disk 102 to secure the shaft 44 against rotation. A radial outer section of the bolt 104 is cylindrical and is sealingly guided in a cylindrical bore 106. The cylindrical bore 106 is connected on the radially inner side to the oil pump mentioned above via a duct (not illustrated). If a specific oil pressure prevails in the cylindrical bore 106, the bolt 104 is pushed radially outward against the pressure of a spring 108 to release the toothed disk 102.

Figure 7:
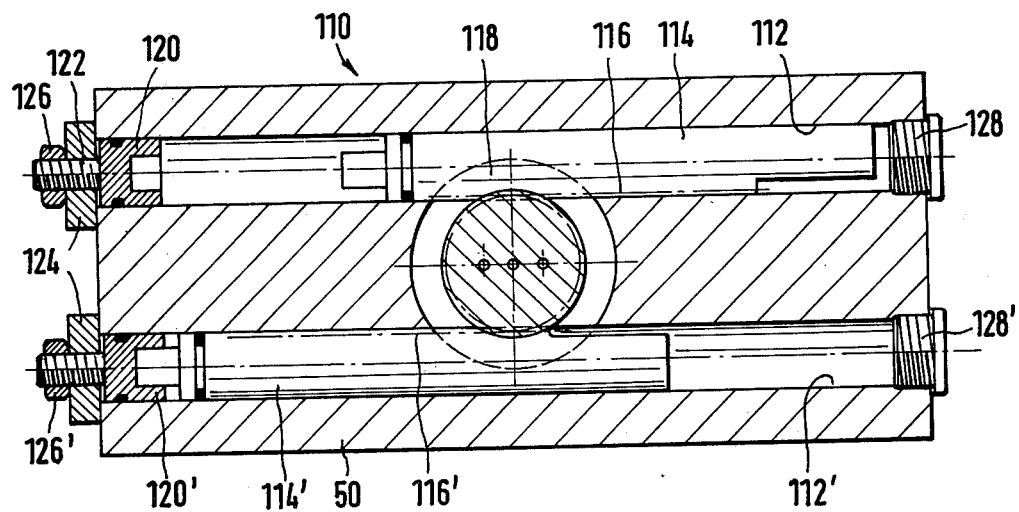
FIG. 7 is a view through the line VII—VII of FIG. 6.

A second swiveling device 110 is provided in order that the grinding head 62 can be automatically swiveled about the second swivel axis 60. As illustrated in FIG. 7, the second swiveling device 110 includes two cylindrical bores 112 and 112' which extend parallel to one another in the feed carriage 50. The bores 112 and 112' extend at right angles to the swivel axis 60 and are equidistantly spaced on either side of the swivel axis 60. Each of the two cylindrical bores 112 and 112' contains a piston 114 and 114', respectively, on which a rack 116 and 116', respectively, is formed. Both racks 116 and 116' mesh at diametrically opposed locations with a pinion 118 formed in the bearing pin 58. Each of the two cylindrical bores 112 and 112' is closed at one end by an adjustable bush 120 and 120', respectively, to which a threaded pin 122 and 122', respectively, is attached. Both threaded pins and 122 and 122' are screwed into a flange 124 and are secured against unintended rotation by nuts 126 and 126', respectively. The threaded pins 122 and 122' are adjusted to move the pistons 114 and 114' which swivels the bearing pin 58 and the grinding head 62 by 180°. To provide for the swiveling motion, each of the cylindrical bores 112 and 112' is connected to the oil pump mentioned above via a controlled oil duct ending near the bush 120 and 120'. The ends of the cylinder bores 112 and 112' removed from the bushes 120 and 120' are each closed by a plug 128 and 128', respectively.

As shown in FIG. 5, the feed carriage 50 contains a pair of ducts 130 which are offset from one another by less than 180° with respect to the second swivel axis 60. The ducts 130 communicate with a cooling pump 131 (FIG. 1) and a distributor ring 132. The grinding head 62 contains two pairs of ducts 134 which are similarly offset from one another by less than 180°. The ducts 134 communicate with the distributor ring 132 and a pair of coolant tubes 136 and 136', both of which end at the active face 74 and 78 of one of the two grinding wheels 72 and 76. The distributor ring 132, which is rotatably mounted to the feed carriage 50 and is coaxial with the bearing pin 58, is attached to the grinding head 62 and contains two angled ducts 138, each of which is constantly connected to one of the ducts 134 of the grinding head 62. In each of two positions offset by 180° which the grinding head 62 selectively assumes in relation to the feed carriage 50, the pair of ducts 138 of the distributor ring 132 connects the ducts 130 of the grinding head 62 with the pair of coolant tubes 136 or 136' associated with the operating grinding wheels 72 or 76.

The above-mentioned oil pump, which is accommodated within the platen 10 and supplies all the hydraulic systems of the illustrated machine, is driven by a motor 140 as illustrated in FIG. 1.

A control console 142 with control lights 144 on a switchboard 146 is indicated in FIGS. 1 to 4. The entire sequence of operations in sharpening one saw blade 16 or a plurality of successive saw blades of the same or different types can be inputed manually or with a program carrier.

The grinding of a so-called Braunschweiger toothing and the grinding of another usual form of group toothing will now be described as examples with the aid of FIGS. 11A to 11D and FIGS. 12A to 12D, respectively.

The terms "sharpening" or "grinding" signify the first sharpening of a saw blade, either just rough-worked by punching or milling or covered with cutting metal, and also the resharpening of a saw blade whose toothing has become blunt from use. The term "saw blades" primarily signifies circular saws, but also signifies band saws or frame saws. In the present invention, a mount for the saw blade may accommodate any one of the above mentioned saw blades and thus a particular mounting for a specific saw blade is not provided. Likewise, in the present invention, the saw blade may be advanced in any suitable, conventional manner and therefore a particular manner in which the saw blade is to be advanced tooth by tooth, or by groups of teeth as the blade is being ground is not provided.

The statement that a certain axis is in the plane of the saw blade primarily signifies that the axis in question is to lie in a central plane between the two side faces of the saw blade. However, certain deviations from this prescribed position are allowed. Therefore, such planes that are at least approximately parallel to the central axis of the saw blade and are at an admissible distance from the saw blade with a view to the desired grinding accuracy are also to be considered as in the plane of the saw blade. In the case of a plate-shaped or bowl-shaped grinding wheel, the active face thereof signifies a ring-shaped face with which the grinding wheel acts on a tooth. The active face is concentric to the axis of the grinding wheel and may be plane, or for instance, may have the shape of a truncated cone.

In the toothing illustrated in FIGS. 11A to 11D, rough-cutting teeth A and finsh-cutting teeth B alternate. A cutting edge of each rough-cutting tooth A has a first face A1 with a positive rake angle. A second face A2, which is located in the upper area of the cutting edge, has a negative rake angle. A narrow center flank A3 is formed at the back of the rough-cutting tooth A and the flank A3 is surrounded by a chamfer A4 on either side. The finish-cutting tooth B has correspondingly named faces B1 to B4. In addition, the finish-cutting tooth B has two chamfers B6 on each side of the cutting edge.

To grind the Braunschweiger toothing, one positions the saw sharpening machine as illustrated in FIG. 1, where the first grinding wheel 72 is arranged such that the first swivel axis 40 extends diametrically across its active face 74. The grinding head 62 assumes a first standard position in which the grinding wheel axis 70 intersects the first swivel axis 40 at right angles and lies in the plane of the saw blade 16. The lifting device 42 causes the first grinding wheel 72 to perform a dipping motion along the first swivel axis 40 towards the axis of tilt 22. During the dipping motion, a finish-cutting tooth B, for example, being the first one to have been positioned in the manner shown in FIG. 1, has its flank B3 ground. The feed carriage 50 is then moved back a small amount in order that the active face 74 of the first grinding wheel 72 does not reengage the flank B3 in the return motion of the radial carriage 38. The support 46 is then swiveled about the first swivel axis 40 through, for example, 45° in accordance with the slope of one of the chamfers B4. In a second dipping motion one chamfer B4 is ground and in a third dipping motion the other chamfer B4 of the finish-cutting tooth is ground.

The machine is then set as illustrated in FIG. 2. Starting out from the position illustrated in FIG. 1, the carrier 34 is tilted about the axis of tilt 22 in a downward direction until an angle corresponding to the positive rake angle of face B1 is formed between the first swivel axis 40 and the horizontal. In addition, the grinding head 62 is swiveled through 180° about the second swivel axis 60 so as to assume a second standard position illustrated in FIG. 2. In the second standard position, the wheel axis 70' intersects the first swivel axis 40 at right angles and the first swivel axis 40 extends diametrically across the active face 78 of the second grinding wheel 76. The face B1 is then ground.

The machine is then positioned according to FIG. 3. The carrier 34 is further tilted downwards about the axis of tilt 22, so that an angle corresponding to the negative rake angle of face B2 is formed between the first swivel axis 40 and the horizontal. In addition, the support 46 is swivelled upwards through 180° about the first swivel axis 40 from the position illustrated in FIG. 2, so that the second swivel axis 60 lies in a vertical plane above the first swivel axis 40. Finally, starting from the position illustrated in FIG. 2, the grinding head 62 is swivelled back through 180° into its first standard position, so that the first swivel axis 40 again extends diametrically across the active face 74 of the first grinding wheel 72 and the grinding wheel axis 70 of the first grinding wheel 72 intersects the first swivel axis 40. In the dipping motion which now takes place, the face B2 having a negative rake angle is ground. Two chamfers B6 at the cutting edge of the finish-cutting tooth B are ground in two further dipping motions, with the support 46 in each case being set at an angle by a swivel movement about the first swivel axis 40.

The saw blade 16 is then moved through one tooth spacing. The operations described are repeated on the next rough-cutting tooth A, except that the setting of the movable machine parts is changed since chamfers are not provided on the cutting edge.

In the manner described, all grinding operations on all the rough-cutting teeth A and finish-cutting teeth B can be performed in one single revolution of the saw blade 16. The resetting of the machine can be programmed to take place automatically and in a very short space of time by virtue of the hydraulic drives described above. The electrohydraulic follow-up servo controls 32 and 100 contribute to the rapid operation of the machine.

It is also possible for the grinding operations described above to be spread over two revolutions of the saw blade. In a first revolution of the saw blade, the flank A3 and chamfers A4 on a rough-cutting tooth A are ground and then the flank B3 and chamfers B4 on a finish-cutting tooth B are ground. These operations are repeated on all the rough-cutting and finish-cutting teeth. In a second revolution of the saw blade 16, the faces A1 and A2 of a rough-cutting tooth are ground and then the faces B1 and B2 as well as chamfers B6 of a finish-cutting tooth B are ground. These operations are repeated on all the rough-cutting and finish-cutting teeth during the second revolution.

The group toothing illustrated in FIGS. 12A to 12D includes groups of teeth consisting of one rough-cutting tooth C and two finish-cutting teeth D in each case. Each rough-cutting tooth C has a face C1 with a positive rake angle as well as a flank C3 with chamfers C4. In a corresponding manner, each finish-cutting tooth D has a face D1 as well as a flank D3 with chamfers D4. The rake angle of the finish-cutting teeth D differs from that of the rough-cutting teeth C. The grinding of this toothing can also be performed automatically on the described machine in several work cycles, in line with the examples described above.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A sharpening machine for sharpening toothed saws, comprising:
   mounting means for supporting a saw blade;
   a carrier mounted for rotation about a tilting axis oriented perpendicular relative to the plane of said saw blade;
   a support mounted on the carrier, said support being arranged so as to selectively swivel relative to the carrier through at least 180° about a first swivel axis lying in the plane of the saw blade, and said support being arranged so as to selectively reciprocate along the first swivel axis;

a grinding head mounted on the support, the grinding head being reciprocable relative to the support between two operating positions;

a first grinding wheel mounted on the grinding head, the first grinding wheel having a first operating position in which an active face of the first grinding wheel is contiguous with the first swivel axis;

a second grinding wheel mounted on the grinding head and arranged in offset relationship with respect to the first grinding wheel, the second grinding wheel having a second operating position in which an active face of the second grinding wheel is contiguous with the first swivel axis; and means for driving said first and second grinding wheels.

2. The sharpening machine of claim 1, wherein the grinding head is arranged to selectively swivel between the two operating positions about a second swivel axis.

3. The sharpening machine of claim 2, wherein the second swivel axis is oriented parallel to the first swivel axis.

4. The sharpening machine of claim 3, wherein the second swivel axis intersects each axis of the first and second grinding wheels at right angles.

5. The sharpening machine of claim 2, wherein the second swivel axis is equidistant from the active faces of the first and second grinding wheels.

6. The sharpening machine of claim 4, wherein the axes of the grinding wheels are in alignment.

7. The sharpening machine of claim 1, wherein the means for driving the first and second grinding wheels is a grinding motor carried in the grinding head.

8. The sharpening machine of claim 7, wherein the grinding motor is disposed between the first and second grinding wheels.

9. The sharpening machine of claim 8, wherein the first and second grinding wheels are attached to separate grinding wheel spindles which are independently coupled to the grinding motor.

10. The sharpening machine of claim 7, wherein the grinding motor is a hydraulic motor.

11. The sharpening machine of claim 4, wherein the grinding head is mounted to a feed carriage which is slidable at right angles to the first and second swivel axes.

12. The sharpening machine of claim 11, further comprising two hydraulic pistons arranged on the feed carriage and wherein each of the two hydraulic pistons are guided in a cylindrical bore and wherein each piston has a rack which meshes with a pinion disposed on the grinding head.

13. The sharpening machine of claim 11, wherein each of the two grinding wheels is associated with at least one coolant tube attached to the grinding head, the coolant tube being connected to a coolant pump by a distributor ring mounted to the feed carriage and the connection being established only when one of the grinding wheels assumes its operating position.

14. The sharpening machine of claim 2, further comprising an hydraulic rotary motor being controlled through an electrohydraulic follow-up servo control to selectively swivel the grinding head about the second swivel axis.

15. The sharpening machine of claim 1, wherein an hydraulic piston-cylinder unit is provided for tilting the carrier about the axis of tilt, said hydraulic piston-cylinder unit being controlled through an electrohydraulic follow-up servo control.

* * * * *